United States Patent [19]
Finch et al.

[11] Patent Number: 5,903,846
[45] Date of Patent: May 11, 1999

[54] COMMUNICATION CHANNEL COORDINATION SYSTEM AND METHOD

[75] Inventors: William R. Finch, Austin; Eddy K. Bell, Round Rock; Javier V. Magana, Austin, all of Tex.

[73] Assignee: Advanced Micro Devices, Inc., Sunnyvale, Calif.

[21] Appl. No.: 08/706,846

[22] Filed: Sep. 3, 1996

[51] Int. Cl.$^6$ .............................. H04M 11/00; H04Q 7/26
[52] U.S. Cl. ............................................ 455/462; 455/516
[58] Field of Search .................................. 455/68, 69, 71, 455/79, 551, 554, 516, 455, 462, 463, 464, 465, 38.1, 434, 515

[56]  References Cited

U.S. PATENT DOCUMENTS

| | | | |
|---|---|---|---|
| 5,280,541 | 1/1994 | Marko et al. | 455/462 |
| 5,297,203 | 3/1994 | Rose et al. | 455/462 |
| 5,384,821 | 1/1995 | Brown et al. | 455/463 |
| 5,434,905 | 7/1995 | Maeda et al. | 455/464 |
| 5,638,369 | 6/1997 | Ayerst et al. | 455/515 |
| 5,642,400 | 6/1997 | Arai et al. | 455/516 |
| 5,715,295 | 2/1998 | Yamashita | 455/455 |
| 5,754,944 | 5/1998 | Dominiak et al. | 455/515 |

*Primary Examiner*—Willis R. Wolfe

[57]  ABSTRACT

A digital cordless telephone communicates with a telecommunications network over a wire link and receives first communications signals from and delivers second communications signals to the telecommunications network. The digital cordless telephone includes a cordless fixed part connected to the wire link for receiving the first communications signals from the telecommunications network and for sending the second communications signals to the telecommunications network over the wire link. The cordless fixed part also transmits the first communications signals, together with first control information generated by the cordless fixed part, including a channel identifier indicative of a desired radio frequency communication channel, and receives the second communications signals, together with second control information. The cordless portable part transmits the second communications signals, together with the second control information generated by the cordless portable part, including the channel identifier and a second recipient identification, for receipt by the cordless fixed part, and receives the first communications signals, together with the first control information, from the cordless fixed part. The telephone includes a fixed part memory for receiving the second control information and a portable part memory for receiving the first control information. A fixed part microcontroller generates the first control information, including the channel identifier, and controls the cordless fixed part to transmit the first communications signals over the desired radio frequency communication channel. A portable part microcontroller reads the channel identifier and controls the cordless portable part to transmit the second communications signals over the desired radio frequency communication channel based on the channel identifier.

18 Claims, 4 Drawing Sheets

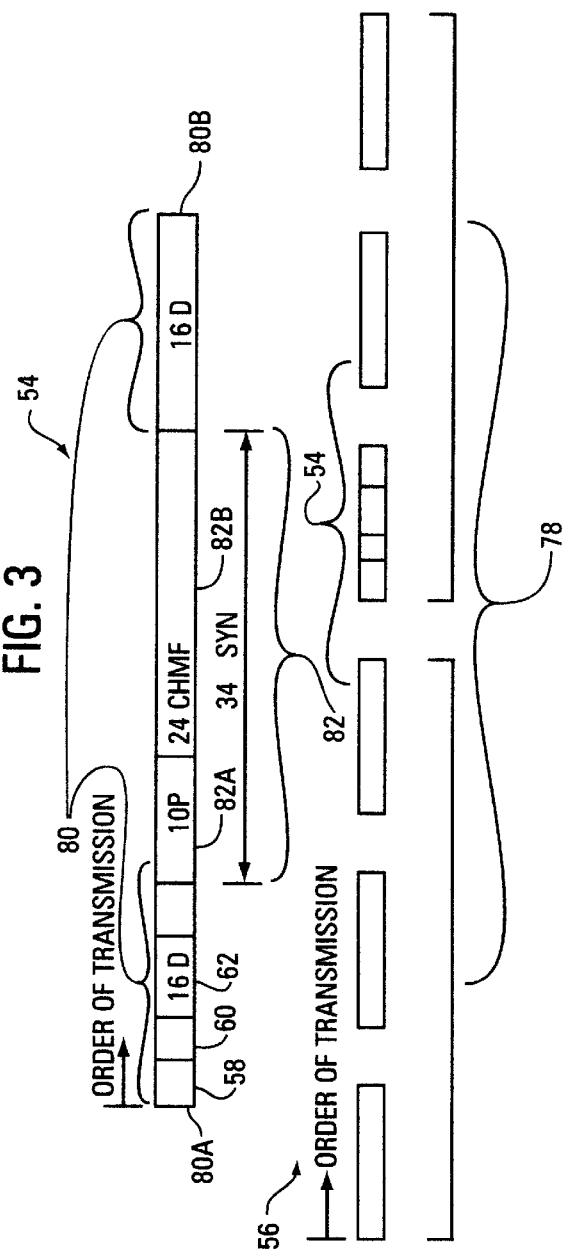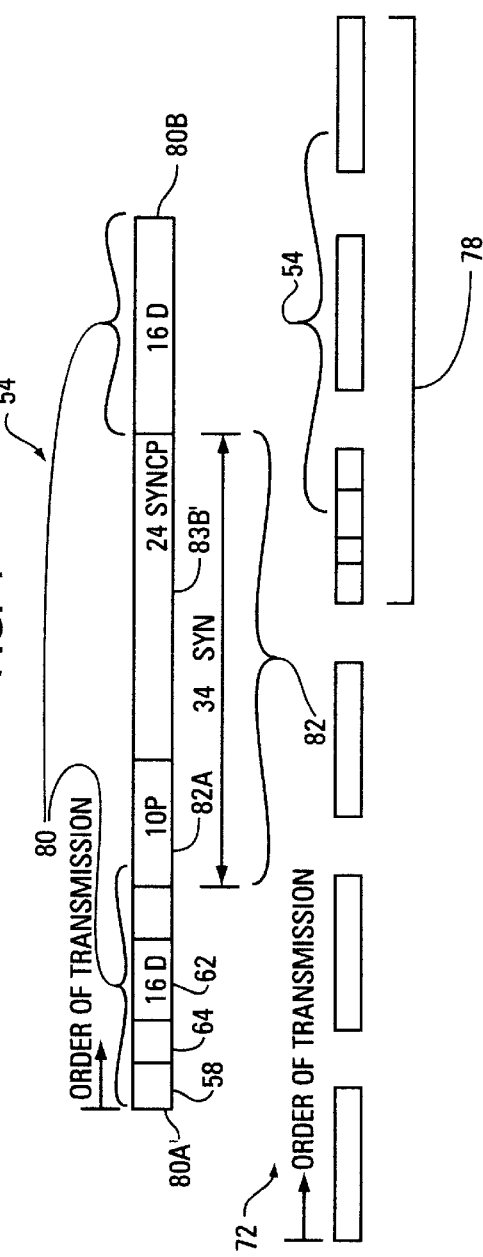

COMMUNICATION CHANNEL COORDINATION SYSTEM AND METHOD

BACKGROUND OF THE INVENTION

The invention relates generally to communications and, more particularly, to a system and method for coordinating between a cordless fixed base set and a cordless portable handset of a digital cordless telephone the particular radio frequency channel over which the base set and the handset communicate.

In conventional cordless communications systems, such as a digital cordless telephone, a basic communication device includes a cordless fixed part, such as a base set device, and a cordless portable part, such as a handset device. The fixed part has a direct wire link to a standard telecommunications network. The portable part is mobile in relation to the fixed part and does not have any wire link with the fixed part or the network. The fixed part and the portable part communicate through radio frequency (RF) signals transmitted and received by the parts. Communications signals are transmitted over RF by the portable part for receipt by the fixed part, and the fixed part delivers the communications signals over the wire link to the standard communications network. Communications signals received over the wire link by the fixed part from the standard communications network are, likewise, transmitted by the fixed part over RF for receipt by the portable part.

In order to achieve desired communications between the fixed part and the portable part over RF, the fixed part and the portable part must each transmit over a particular RF bandwidth, or "channel", that is receivable by the other of the parts. The particular channel (or channels, as the case may be) authorized for such transmissions may be designated by a particular industry standard, such as the Cordless Telephony Generation 2 (CT2) or the Digital European Cordless Teleconmmunications (DECT) standard, by governmental requirements, such as the U.S. governmnent's designation of the so-called 900 MHz channel, i.e., 902 MHz to 928 MHz (i.e., the "ISM band"), for cordless telecommunications in the U.S., or by some other source. In any event, only particular ones of the authorized channels may be open at any instant to accommodate desired transmissions and receptions between any given fixed part and portable part. This is the case for a variety of reasons, including that other communications devices may also be transmitting and receiving over the same particular channel, transmissions by other devices on neighboring channels may "bleed-over" to the particular channel, noise may be experienced on the particular channel, or the particular channel may otherwise be unsuitable or unavailable.

In conventional cordless communications systems, either the fixed part or the portable part chooses the particular communications channel for RF communications between the parts from among the authorized and open channels. The part that chooses the channel is referred to here as the "master", and the other part is referred to as the "slave". In conventional operations, the slave part has typically employed a phase lock loop of the part to lock-on the communications channel chosen by the master part. Communications over the chosen channel are thereby coordinated based on the choice of the master part and the locking-on by the slave part. The typical master part and slave part have required various filters to distinguish receptions and to provide transmissions over the particular channel chosen by the master part.

Although ideally the fixed part and the portable part choose and lock-on the appropriate channel (or channels) for communications, one problem has been that the parts, in actual operations, sometimes end up communicating over different channels, such as two different adjacent RF channels. This can happen for a number of reasons, including the presence of noise and interference, the quality of the equipment of the fixed part and the portable part, and others. When the parts are communicating, albeit over different channels, transmissions over one channel may "bleed over" into another channel so that the parts believe they are communicating over the same channel when, in fact, they are not. The filters and phase lock loops of the parts are intended to distinguish and choose the appropriate RF channel, however, the parts do not always do so presenting the problem of communications over different channels.

This problem of communications over different channels by the fixed part and portable part is particularly prevalent in digital cordless telephones intended for individuals as the consumers. In the case of those telephones, a major concern has been maintaining low cost of the telephones to the consumers. In designing digital cordless telephones for individual consumers, therefore, lower cost components are generally preferred. There is generally a trade-off, however, between component equipment cost, on the one hand, and quality, on the other hand. Typically, as component equipment cost decreases, so does quality, and vice versa. An example of components available at varied cost with directly proportional varying quality is RF filters. If low cost RF filters are included in the fixed part and the portable part of a digital cordless telephone, a consequence may be that the fixed part and the portable part do not always communicate over the appropriate channel.

Therefore, what is needed is a low cost, accurate, and otherwise desirable system and method for coordinating communication channels (both transmit and receive channels) of the fixed part and the portable part of a digital cordless telephone to achieve communications over a desired RF channel or channels.

SUMMARY OF THE INVENTION

The present invention, accordingly, provides a low cost and accurate apparatus and method for coordinating the RF communication channel over which a cordless fixed part and a cordless portable part of a digital cordless telephone communicate. The invention provides numerous advantages and advances, including, for example, low cost implementation, existing system adaptability, and improved communications accuracy and quality. The invention provides these advantages and advances without increasing expense of digital cordless telephones through use of more expensive hardware, such as expensive RF filters or expensive synthesizer and phase lock loop components, in such telephones.

To this end, an embodiment of the invention is a digital cordless telephone for communicating with a telecommunications network over a wire link connecting the digital cordless telephone to the telecommunications network. The digital cordless telephone receives first communications signals from and delivers second communications signals to the telecommunications network. The digital cordless telephone includes a cordless fixed part connected to the wire link for receiving the first communications signals from the telecommunications network and for sending the second communications signals to the telecommunications network over the wire link. The cordless fixed part also transmits the first communications signals, together with first control information generated by the cordless fixed part and comprising a channel identifier indicative of a desired radio frequency communication channel, and receives the second communications signals, together with second control information, over radio frequency. The telephone also includes a cordless portable part, unattached physically, but communicatingly attached through radio frequency, to the cordless fixed part, transmits the second communications signals, together with the second control information generated by the cordless portable part and comprising the channel identifier and a second recipient identification, over radio frequency for receipt by the cordless fixed part, and receives the first communications signals, together with the first control information, over radio frequency from the cordless fixed part. The telephone also includes a fixed part memory, connected to the cordless fixed part, for receiving the second control information and a portable part memory, connected to the cordless portable part, for receiving the first control information. Further, the telephone includes a fixed part microcontroller, connected to the fixed part memory and the cordless fixed part, for generating the first control information, including the channel identifier, and for controlling the cordless fixed part to transmit the first communications signals over the desired radio frequency communication channel and a portable part microcontroller, connected to the portable part memory and the cordless portable part, for reading the channel identifier and controlling the cordless portable part to transmit the second communications signals over the desired radio frequency communication channel based on the channel identifier.

Another embodiment of the invention is a digital cordless telephone for communicating with a telecommunications network over a wire link connecting the digital cordless telephone to the telecommunications network. The digital cordless telephone receives first communications signals from and delivers second communications signals to the telecommunications network. The digital cordless telephone comprises a cordless portable part for transmitting first communications signals, together with first control information generated by the cordless portable part and comprising a channel identifier indicative of a desired radio frequency communication channel, over radio frequency for receipt by a cordless fixed part, and for receiving second communications signals, together with second control information, over radio frequency and a cordless fixed part connected to the wire link for receiving the second communications signals from the telecommunications network and for sending the first communications signals to the telecommunications network over the wire link and also communicatingly attached through radio frequency, although unattached physically, to the cordless portable part, the cordless fixed part also for receiving the first communications signals, together with first control information, including the channel identifier, from the cordless portable part over radio frequency and for transmitting the second communications signals, together with second control information generated by the cordless fixed part and comprising the channel identifier indicative of the desired radio frequency communication channel. The telephone also comprises a fixed part memory, connected to the cordless fixed part, for receiving the second control information and a portable part memory, connected to the cordless portable part, for receiving the first control information. Moreover, the telephone comprises a fixed part microcontroller, connected to the fixed part memory and the cordless fixed part, for generating the first control information, including the channel identifier, and for controlling the cordless fixed part to transmit the first communications signals over the desired radio frequency communication channel and a portable part microcontroller, connected to the portable part memory and the cordless portable part, for reading the channel identifier and controlling the cordless portable part to transmit the second communications signals over the desired radio frequency communication channel based on the channel identifier.

Yet another embodiment of the invention is a method of coordinating a desired radio frequency communication channel, from among more than one possible communication channels, between a cordless fixed part and a cordless portable part of a digital cordless telephone. The desired radio frequency communications channel serves to carry communications signals passed between the cordless fixed part and the cordless portable part. The method comprises the steps of polling by the cordless portable part of each of the more than one possible communication channels to check for a transmission by the cordless fixed part; transmitting by the cordless fixed part over the desired radio frequency communication channel to initiate a first communication with the cordless portable part over the desired radio frequency communication channel; detecting by the cordless portable part to determine that the first communication is initiated through the step of transmitting, to receive the first communication if the communication is so initiated, and to determine a channel identifier of the first communication indicative of the desired radio frequency communication channel; setting by the cordless portable part of a channel over which the cordless portable part communicates to the desired radio frequency communication channel, based on the determination of the channel identifier through the step of detecting; and responding by the cordless portable part with a second communication to indicate to the cordless fixed part that the cordless portable part received the first communication and is ready for further communication over the desired radio frequency communication channel.

Another embodiment of the invention is a method of coordinating a desired radio frequency communication channel, from among more than one possible communication channels, between a cordless fixed part and a cordless portable part of a digital cordless telephone, the desired radio frequency communications channel serving to carry communications signals passed between the cordless fixed part and the cordless portable part. The method comprises the steps of polling by the fixed portable part of each of the more than one possible communication channels to check for a transmission by the cordless portable part; transmitting by the cordless portable part over the desired radio frequency communication channel to initiate a first communication with the fixed portable part over the desired radio frequency communication channel; detecting by the fixed portable part to determine that the first communication is initiated through the step of transmitting, to receive the first communication if the communication is so initiated, and to determine a channel identifier of the first communication indicative of the desired radio frequency communication channel; setting by the fixed portable part of a channel over which the fixed portable part communicates to the desired radio frequency communication channel, based on the determination of the channel identifier through the step of detecting; and responding by the fixed portable part with a second communication to indicate to the cordless portable part that the fixed portable part received the first communication and is ready for further communication over the desired radio frequency communication channel.

Another embodiment of the invention is a method of setting a synthesizer of a first cordless part of a digital cordless telephone so that the first cordless part transmits over a specific radio frequency channel chosen by a second cordless part of the digital cordless telephone. The method comprises the steps of receiving an indicator representative of the specific radio frequency channel by the first cordless part from the second cordless part over radio frequency; storing the indicator in a memory as digital bits; powering up the synthesizer of the first cordless part; setting a port timing and a mode of a serial input/out port of the synthesizer to ready the synthesizer to receive a serial stream of digital data representative of the digital bits in the memory; enabling the synthesizer to receive the serial stream of digital data; sending the serial stream of digital data from the memory to the synthesizer; writing the serial stream of digital data to the synthesizer; and delaying to allow the synthesizer to stabilize on the specific radio frequency channel represented by the serial stream of digital data as derived from the indicator.

BRIEF DESCRIPTION OF THE DRAWINGS

FIG. 3 is a format of a single frame of a MUX2 multiple logical format data packet and an information burst comprising six of those frames, which information burst is transmitted by the cordless fixed part to the cordless portable part in the method of FIG. 2, when the cordless fixed part initiates the communication.

FIG. 4 is a format of a single frame of the MUX2 multiple logical format data and a response burst comprising six of those frames, which response burst is transmitted by the cordless portable part for receipt by the cordless fixed part in the method of FIG. 2, after the cordless portable part has received an information burst from the cordless fixed part and has determined that the information burst is intended for the cordless portable part.

FIG. 6 is a format of a single frame of a MUX3 multiple logical format data packet, which single frame is an initiation burst transmitted by the cordless portable part to the cordless fixed part in the method of FIG. 5, when the cordless portable part initiates the communication.

FIG. 7 is a format of a single frame of the MUX2 multiple logical format data packet and a reply burst comprising six of those frames, which reply burst is transmitted by the cordless fixed part for receipt by the cordless portable part in the method of FIG. 5, after the cordless fixed part has received an information burst from the cordless portable part and has determined that the initiation burst is intended for the cordless fixed part.

FIG. 8 is a flowchart of a method, according to an embodiment of the present invention, for programming a synthesizer of either a cordless fixed part or a cordless portable part of a digital cordless telephone to a desired RF channel for communications, when the other of the parts transmits a signal indicating the desired RF channel and the cordless fixed part or the cordless portable part, as the case may be, receives the signal.

DESCRIPTION OF THE PREFERRED EMBODIMENT

Figure 1:
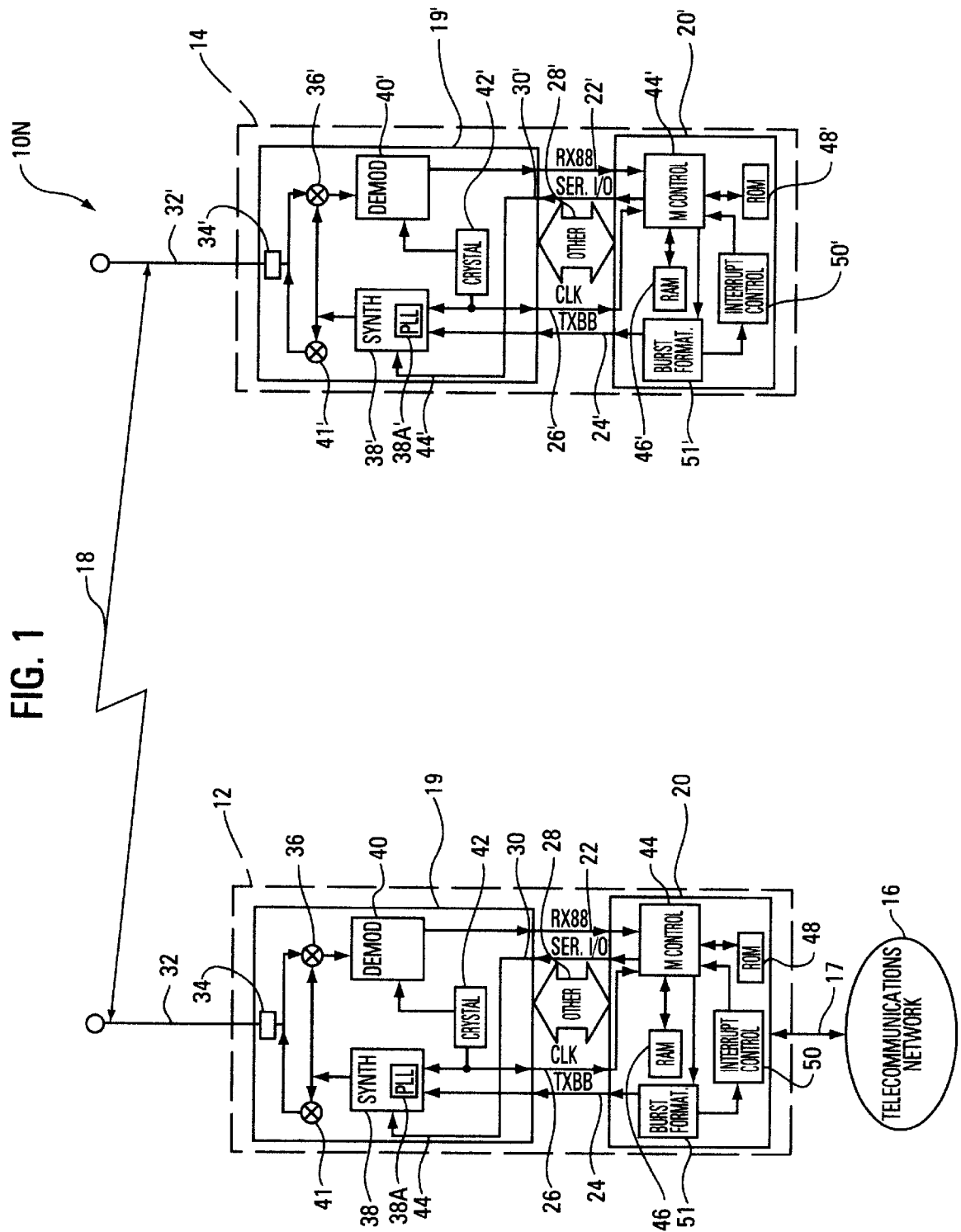
FIG. 1 illustrates an embodiment of a digital cordless telephone of the present invention, which digital cordless telephone provides coordination of the RF communication channel over which a cordless fixed part and a cordless portable part of the digital cordless telephone transmit and receive communications.

The Digital Cordless Telephone and Communication Channel Coordination:

Referring to FIG. 1, the reference numeral 10 refers, in general, to an embodiment of a digital cordless telephone of the present invention. The digital cordless telephone 10 comprises a cordless fixed part (CFP) 12 and a cordless portable part (CPP) 14. The digital cordless telephone 10 provides coordination, between the CFP 12 and the CPP 14, of the RF channel over which the CFP 12 and the CPP 14 communicate.

The CFP 12 is connected to a telecommunications network 16 by a wire link 17. The telecommunications network 16 is typically a PSTN (Public Switched Telephone Network), although the telecommunications network 16 could alternatively be an ISDN (Integrated Services Digital Network) or other communications network. The wire link 17 allows the CFP 12 to send and receive communications to and from the telecommunications network 16, and vice versa.

The CPP 14 is not wired to the CFP 12 or the telecommunications network 16. Instead, the CPP 14 communicates with the CFP 12 over RF. The CPP 14 and the CFP 12 communicate through RF signals 18. Although the CFP 12 and the CPP 12 so communicate over RF, the CPP 14 and the CFP 12 operate digitally as parts of the digital cordless telephone 10.

The CFP 12 comprises a radio module 19 and a digital telephone 20. A receive wire 22 connects the radio module 19 to the digital telephone 20. The radio module 19 sends over the receive wire 22 to the digital telephone 20 digital receive signals (RXBB) indicative of the RF signals 18 received by the CFP 12 from the CPP 14. A transmit wire 24 also connects the digital telephone 20 and the radio module 19. The digital telephone 20 sends over the transmit wire 24 to the digital telephone 20 digital transmit signals (TXBB) indicative of the RF signals 18 to be transmitted by the CFP 12 to the CPP 14. A clock wire 26 further connects the radio module 19 to the digital telephone 20. The clock wire 26 provides for common usage of a clock signal (CLK) by the radio module 19 and the digital telephone 20. A serial input/output (SIO) wire 30 connects the digital telephone 20 to the radio module 19. Other wires 28 also connect the digital telephone 20 to the radio module 19. The other wires 28 provide for exchange of other control signals and information between the digital telephone 20 and the radio module 19.

The radio module 19 comprises various radio components. An antenna 32 of the radio module 19 serves to receive and transmit the RF signals 18. An antenna switch 34 is connected to the antenna 32 for switching between receptions and transmissions by the radio module 19. The antenna switch 34 is connected to transmit side and receive side circuitry and components of the radio module 19.

With respect to transmit side circuitry and components, the antenna switch 34 is connected to a transmit mixer 36. A synthesizer 38, as later discussed in more detail, is also connected to the transmit mixer 36. The synthesizer 38 comprises a phase lock loop (PLL) 38*a*. Furthermore, a demodulator 40 is also connected to the transmit mixer 36.

A crystal timer 42 is connected to the demodulator 40. The demodulator 40 is connected to the receive wire 22.

As for receive side circuitry and components, a receive mixer 41 is connected to the antenna switch 34. The synthesizer 38 is commonly connected to the receive mixer 41 and the transmit mixer 36. The synthesizer 38 is also connected to the crystal timer 42. Furthermore, the synthesizer 38 is connected to the transmit wire 24. A serial input/output (SIO) port 44 of the synthesizer 38 is connected to the SIO wire 30. The crystal timer 42 of the radio module 19 is connected with the clock wire 26.

The foregoing components and connections of the radio module 19 of the CFP 12 are conventional. A particular example of the synthesizer 38 is the Model MB1511 Serial Input PLL Frequency Synthesizer available from Fujitsu Limited. In the subsequent discussion, it is to be understood that this particular synthesizer is the synthesizer 38 in references to timing and settings. That particular synthesizer is a single chip, serial input, phase lock loop, frequency synthesizer designed for VHF tuner and cellular telephone applications. This synthesizer contains a 1.1 GHz dual modulus prescalar which enables pulse swallow function and an analog switch to speed lock-on time by the phase lock loop of the synthesizer. In addition to the components and connections specifically identified above, the radio module 19 may comprise other conventional components and connections, as well, such as filters, amplifiers, a voltage regulator, buffers, and others. Those skilled in the relevant art will know and appreciate the possible components and connections making up the radio module 19.

The digital telephone 20 of the CFP 12 also comprises various conventional components and connections. A microcontroller 44 of the CFP 12 is connected to the clock wire 26, the SIO wire 30, and the receive wire 22. A particular example of the microcontroller 44 is the 80C32 microcontroller available from Advanced Micro Devices. In the subsequent discussion, it is to be understood that this particular microcontroller is the microcontroller 44 in references to timing and controlling. Memories, such as a random access memory (RAM) 46 and a read only memory (ROM) 48, are connected to the microcontroller 44. The microcontroller 44 is also connected to an interrupt controller 50 and a burst formatter 51. The interrupt controller 50 is connected to the burst formatter 51. The digital telephone 20 may also comprise other conventional components and connections, such as coders, decoders, transcoders, a power source, additional memories, for example, EEPROM, a keypad, a microphone, an earpiece, a ringer, and others.

In the CFP 12, a software program, as more fully described in subsequent sections, is stored in the RAM 46 of the digital telephone 20 of the CFP 12. The software program operates to set the PLL 38a of the synthesizer 38 to a desired RF channel when the CPP 14 initiates communication with the CFP 12 over RF. The CPP 14, when initiating a communication to the CFP 12, chooses the desired RF channel from among several possible RF channels for the communication. The RF signals 18 transmitted by the CPP 14 to the CFP 12 in the initiation of the communication comprise representations of digital bits indicative of the desired RF channel so chosen by the CPP 14. These representations of bits indicative of the desired RF channel, as received by the CFP 12 from the CPP 14, are stored in the RAM 46 of the CFP 12 by the microcontroller 44. The software program stored in the RAM 46, when performed by the microcontroller 44, coordinates RF communications channels between the CFP 12 and the CPP 14 by setting the synthesizer 38 of the CFP 12 to the desired RF channel chosen by the CPP 14. Because the synthesizer 38 of the CFP 12 is so set to the desired RF channel, the PLL 38a of the synthesizer cannot incorrectly lock-on an uncoordinated RF channel; thus, communications between the CFP 12 and the CPP 14 do not occur over different channels. Details of the setting of the synthesizer 38 through performance of the software program are given in subsequent sections.

Operations of the CFP 12 are generally conventional, except that the software program, rather than the PLL 38a of the synthesizer 38, sets the synthesizer 38 to the desired RF channel. In conventional operations, the PLL 38a of the synthesizer 38 locks-on the RF signals 18 received by the CFP 12 from the CPP 14. In those conventional operations, as those skilled in the relevant art will know and appreciate, the PLL 38a of the synthesizer 38 requires a period of time to stabilize and lock-on the RF signals 18 and may not always lock-on the desired RF channel. In the CFP 12, however, the software program stored in the RAM 46 sets the synthesizer 38 to exactly the desired RF channel based on the representations of digital bits indicative of the desired RF channel received by the CFP 12 through the RF signals 18 transmitted by the CPP 14.

The CPP 14 of the digital cordless telephone includes identical components and connections to those of the CFP 12. For ease of reference, the same numerals used in referring to those components and connections of the CFP 12 are used with an "'" in referring to the identical components and connections of the CPP 14. The operations of the CPP 14, including the software program stored in the RAM 46' of the CPP 14, are also identical to those of the CFP 12, except as hereafter described.

Figure 2:
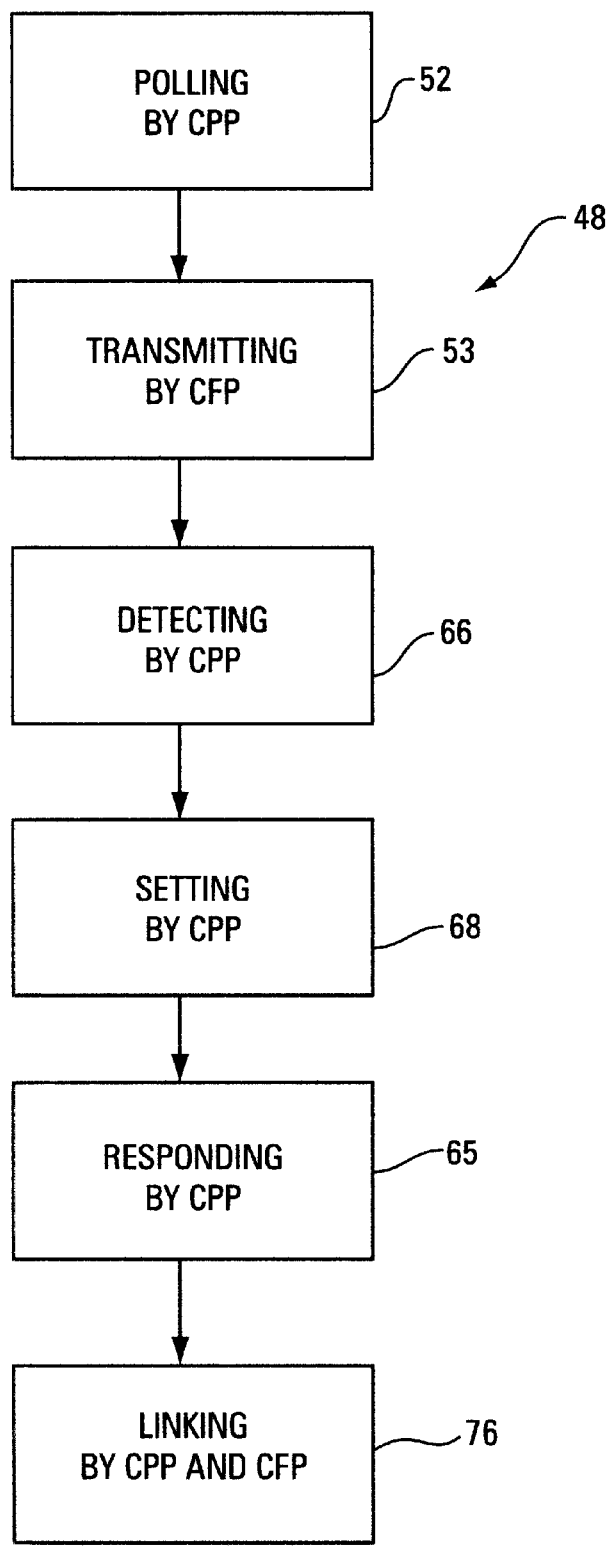
FIG. 2 is a flowchart of a method, according to an embodiment of the present invention, for coordinating the RF communication channel over which a cordless fixed part and a cordless portable part of a digital cordless telephone transmit and receive communicated information, when the cordless fixed part initiates a communication.

Communication Initiated by the Cordless Fixed Part:

Referring to FIGS. 2–4, in conjunction, the reference numeral 48 refers, in general, to a method for coordinating communication channels for RF communications, when the cordless fixed part (CFP) 12 (FIG. 1) initiates communications with the cordless portable part (CPP) 14 (FIG. 1) of the digital cordless telephone 10 (FIG. 1).

In a step of polling 52, the CPP 14 scans among several possible RF channels over which the CFP 12 may transmit. The CPP 14 so scans to determine if the CFP 12 transmits a communication signal over a single RF channel of the several possible RF channels. The several possible RF channels may be designated by an industry standard, a governmental requirement, particular design considerations, or other factors. The CPP 12 first checks the single RF channel having a lowest frequency, then next checks the single RF channel having a next higher frequency, and thereafter checks the single RF channel having the next higher frequency. The CPP 12 sequentially checks each of the possible RF channels in this manner, proceeding to check each next higher frequency RF channel of the several possible RF channels. After the single RF channel having a highest frequency is checked, the CPP 12 re-commences the scan beginning with the single RF channel having the lowest frequency. The CPP 12 continuously scans in this manner until the step of polling 52 ceases.

In a step of transmitting 53, the CFP 12, when a call is received by the CFP 12 over the wire link 17 from the telecommunications network 16, chooses a desired RF channel for communication with the CPP 14, from among the possible RF channels for the communication. The CFP 12 chooses the desired RF channel from among the possible RF channels based on a variety of factors according to design of the digital cordless telephone 10, as is conventional. The factors may include, for example, lack of noise on the channel, lack of other users of the channel, and others. Once the CFP 12 chooses the desired RF channel, the CFP 12 transmits six bursts (or "frames") of a MUX2 multiple logical format data packet 54 in a time division duplex (TDD) manner over the desired RF channel to the CPP 14. The six frames of the MUX2 multiple logical format data packet 54 are an information burst 56 (FIG. 3). The information burst 56 comprises within the six frames of the MUX2 multiple logical format data packet 54 various data bits representative of a link request 58, a CPP identification 60, and a channel identifier 62. The CPP identification 60 indicates to the CPP 14 that the CPP 14 is the intended recipient of the information burst 56, and the channel identifier 62 indicates to the CPP 14 the desired RF channel for further communications.

Each of the six frames of the MUX2 multiple logical format data packet 54 of the information burst 56, in the step of transmitting 53, is transmitted by the CFP 12 over a transmit time of a minimum of 1.4 s (Tfcyc) followed by an off time of 0.424 s during which there is no transmission by the CFP 12, and is then repeated over and over, unless and until either: (i) a response from the CPP 14 is received by the CFP 12 or (ii) a link establishment timeout expires or (iii) the CFP 12 ceases to request link establishment. If the response from the CPP 14 is received by the CFP 12, the link is established when the CFP 12 accepts the response from the CPP 14, comprising a CFP identification 64, before the expiration of the transmit time. If, on the other hand, the link establishment timeout expires and the response from the CPP 14 has not been received by the CFP 12, the CFP 12 chooses a new RF channel and transmits the information burst 56 in the same manner over the new RF channel in further attempt at link set up with the CPP 14. The link establishment timeout expires if the response from the CPP 14 in a step of responding 65 is not received by the CFP 12 before the expiration of the transmit time. New RF channels continue to be chosen and the information burst 56 is transmitted over each new RF channel until the transmit time expires or a link is established. Finally, in the event that the response from the CPP 14 is not received and link set up is not made over the new RF channel (or any additional new RF channels thereafter, as the case may be) prior to expiration of the link establishment timeout, the CFP 12 ceases link establishment attempts upon conclusion of the link establishment timeout period. The link establishment timeout period is 5 s (Tfinax).

In a step of detecting 66, the CPP 14 checks each of the possible RF channels, individually, as the channel is scanned in the step of polling 52. The CPP 14 so checks each of the possible RF channels in order to detect whether the link request 58 is then being transmitted over the channel. If the link request 58 is detected by the CPP 14, the CPP 14 reads and interprets the information burst 56 comprising the link request 58. As the information burst 56 is read and interpreted, the CPP 14 reads and interprets the CPP identification 60 and the channel identifier 62. The channel identifier 62 tells the CPP 14 which single one of the possible RF channels for communications between the CPP 14 and the CFP 12 is the desired RF channel. The CPP identification 60 is specific for the CPP 14 and indicates to the CPP 14 that it is the intended recipient of the transmitted information burst 56. When the CPP 14 receives the information burst 56, reads and interprets it, and finds the CPP identification 60, the CPP 14 ceases the step of polling 52.

In a step of setting 68, the CPP 14 programs a synthesizer 38' (FIG. 1) of the CPP 14 to cause the synthesizer 38' to immediately lock-on the desired RF channel indicated by the channel identifier 62. The step of setting 68 the synthesizer 38 is performed by the software program stored in the RAM 46 of the CPP 14. On command from the CPP 14, as controlled by the software program, the synthesizer 38' switches to the desired RF channel and, thereafter, receives and transmits on the desired RF channel.

In the step of responding 65, the CPP 14 transmits six frames of the MUX2 multiple logical format data packet 54, in a TDD manner, over the desired RF channel for receipt by the CFP 12. The six frames are a response burst 72 (FIG. 4). The response burst 72 is transmitted by the CPP 14 over the desired RF channel, as read and interpreted by the CPP 14 from the channel identifier 62 of the information burst 56 transmitted by the CFP 12 in the step of transmitting 53. The response burst 72 is of the same general format as the information burst 56, however, the response burst 72 includes the CFP identification 64 in place of the CPP identification 60. The response burst 72 indicates to the CFP 12 that the CPP 14 received the information burst 56 and is prepared for further link establishment. The CFP identification 64 of the response burst 72 is specific for the CFP 12. The response burst 72, with its CFP identification 64, confirms to the CFP 12 that the CPP 14 is appropriate for continuing communications.

In a step of linking 76, the CFP 12 and the CPP 14 transmit and receive over the desired RF channel, each to the other, link set up signals. These link set up signals indicate to the CPP 14 and the CFP 12 to continue through a prescribed protocol for digital link establishment. Once the step of linking 76 is concluded, communications of various desired data and voice information is communicated between the CFP 12 and the CPP 14 solely over the desired RF channel.

The Information Burst:

Referring to FIG. 3, in conjunction with FIGS. 1 and 2, the CPP 14 expects, in the step of detecting 66, to receive the information burst 56 over one of the possible RF channels. In the step of transmitting 53, the CFP 12, after choosing the desired RF channel, transmits the information burst 56. The transmission by the CFP 12 of each individual frame of the MUX2 multiple logical format data packet 54 of the information burst 56 occurs over 6 ms and is repeated after a delay of 2 ms after the conclusion of the preceding transmission. As the CPP 14 scans the possible RF channels in the step of polling 52, the CPP 14 receives the information burst 56 if the information burst 56 has been transmitted by the CFP 12 and if the CPP 14 detects the information burst 56 when checking the desired RF channel during the scan.

The six frames of the information burst 56 comprise two code words 78 of three frames each. Each of the six frames of the MUX2 multiple logical format data packet 42 of the information burst 56 transmitted by the CFP 12 include two sub-formats (also referred to as "sub-channels") multiplexed within the available data bandwidth of the desired RF channel. Because the information burst 56 includes the two sub-channels, the MUX2 multiple logical format data packet 54 is referred to as a multiplex two (MUX2). The MUX2 multiple logical format data packet 54 carries as the sub-channels a D channel 80 and a SYN channel 82. The D channel 80 is carried at a data rate of 16.0 kbit/s, and the SYN channel 82 is carried at an overall rate of 17.0 kbit/s. The D channel 80 comprises two sixteen bit sequences of each frame of the MUX2 multiple logical format data packet 54. The two sixteen bit sequences occur immediately prior to and immediately after the SYN channel 82. The SYN channel 82 of each frame of the MUX2 multiple logical format data packet 54 comprises ten bits of a preamble 82a (one-zero transitions) followed by twenty four bits of a channel marker (CHMF) 82b.

The D channel 80 is control bits. The first sixteen bit sequence of the D channel 80 of each frame of the information burst 56 is, collectively, a synchronization word, SYNCD 80a. The SYNCD 80a contains the link request 58 and the CPP identification 60. The subsequent sixteen bit sequence of the D channel 80 of each frame of the information burst 56 is available for other control information 80b. The channel identifier 62 may be included in either the SYNCD 80a or the other control information 80b of the D channel 80. The SYN channel 82 is synchronization bits. The preamble 82a of the SYN channel 82 allows the CPP 14 to gain bit synchronization before the CPP 14 detects the CHMF 82b of the SYN channel 82. The CHMF 82b is a special bit pattern which marks the information burst 56 transmitted by the CFP 12 as an attempt by the CFP 12 to initiate the link with the CPP 14. The CHMF 82b transmitted by the CFP 12 has the following bit pattern:

1011.1110.0100.1110.0101.0000 (BE4E50H)

If the CHMF 82b is detected within the period of the link establishment timeout prior to the timeout expiration, the D channel 80 is then decoded by the CPP 14 to yield to the CPP 14 the control information of the D channel 80, including the link request 58, the CPP identification 60, and the channel identifier 62.

The Response Burst:

Referring to FIG. 4, in conjunction with FIGS. 1 and 2, the CFP 12 expects to receive the response burst 72 from the CPP 14 in the step of responding 65, if the CPP 14 has detected the information burst 56 (FIG. 3) transmitted by the CFP 12. If the CPP 14, in fact, receives the information burst 56, the CPP 14 transmits the response burst 72. The CPP 14 transmits the response burst 72 over the desired RF channel indicated by the channel identifier 62 (FIG. 3), as read and interpreted by the CPP 14 from the information burst 56.

The response burst 72 comprises six frames of the MUX2 multiple logical format data packet 54, including the two sub-channels. The MUX2 multiple logical format data packet 54 in the case of the response burst 72, therefore, includes a D channel 80 and a SYN channel 82. The D channel 80 and the SYN channel 82 are carried at the same rates and comprise the same number of bits of each of the six frames of the MUX2 multiple logical format data packet 54 previously described with respect to the information burst 56.

The response burst 72, however, differs from the information burst 56 in that the SYNCD 80a' contains the CFP identification 64, rather than the CPP identification 60 (FIG. 3). Further, the response burst 72 differs from the information burst 56 because the response burst contains a SYNCP 83b', rather than the CHMF 82b (FIG. 3). The SYNCP 83b' is a bit pattern used when a link has been established between the CFP 12 and the CPP 14. The SYNCP 83b' transmitted by the CPP 14 has the following bit pattern:

0001.0100.1110.0100.1111.1010 (14E4FAH)

The SYNCP 83b' may only be transmitted by the CPP 14 to the CFP 12 when the CHMF 82b of the information burst 56 has been correctly detected and the CPP identification 60 found by the CPP 14 is correct for the CPP 14.

Voice Communications:

Referring to FIGS. 1–4, in conjunction, after completion of the method 48, just described, for coordinating the desired RF channel between the CFP 12 and the CPP 14, the CFP 12 and the CPP 14 thereafter transmit and receive protocols and data and voice information over the desired RF channel. Through the method 48, each of the CFP 12 and the CPP 14 transmit and receive only over the desired RF channel. This is the case because the CFP 12 chooses the desired RF channel and because the CPP 14 receives and reads the information burst 56 transmitted by the CFP 12, which information burst 56 includes the channel identifier 62 indicative to the CPP 14 of the desired RF channel, and sets the synthesizer 38' of the CPP 14 to transmit and receive over the desired RF channel. The communication between the CFP 12 and the CPP 14 of protocols and data and voice information over the desired RF channel after the method 48 is completed proceeds in a conventional manner, as those skilled in the relevant art will know and appreciate.

Figure 5:
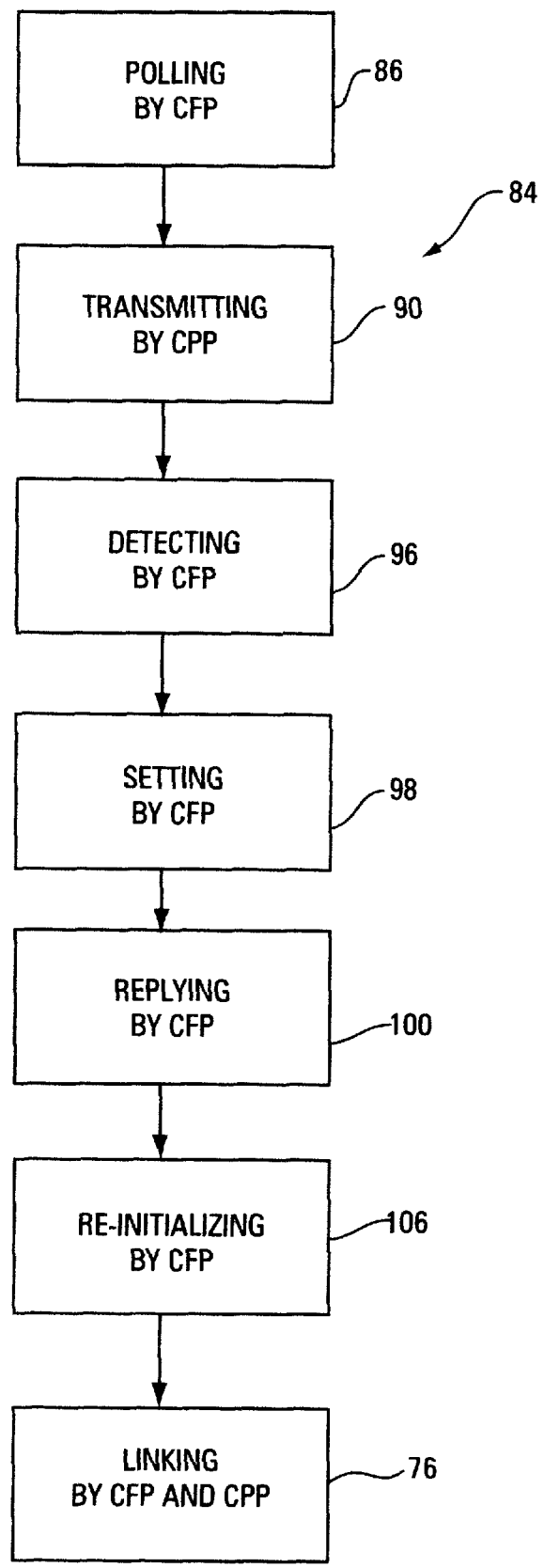
FIG. 5 is a flowchart of a method, according to an embodiment of the present invention, for coordinating the RF communication channel over which a cordless fixed part and a cordless portable part of a digital cordless telephone transmit and receive communicated information, when the cordless portable part initiates a communication.

Communication Initiated by the Cordless Portable Part:

Referring to FIGS. 5–7, in conjunction, the reference numeral 84 refers, in general, to an embodiment of the method of the present invention for coordinating communication channels for RF communications, when the CPP 14 (FIG. 1) initiates communications with the CFP 12 (FIG. 1) of the digital cordless telephone 10 (FIG. 1).

In a step of polling 86, the CFP 12 scans, low frequency to high frequency, with repetitions, each of the possible RF channels over which the CPP 14 may transmit. The CFP 12 scans the channels to determine if the CPP 14 transmits a communications signal of the form of an initiation burst 87. The CFP 12 performs the step of polling 86 in the method 84 in the same manner as the CPP 14 does so in the method 48 (FIG. 2).

In a step of transmitting 90, the CPP 14, when a new call is initiated at the CPP 14 by a user, chooses a desired RF channel for communication with the CFP 12, from among the possible RF channels for the communication. The CPP 14 chooses the desired RF channel in the same manner that the CFP 12 chooses the channel in the method 48. Once the CPP 14 chooses the desired RF channel, the CPP 14 transmits, in a TDD manner, the initiation burst 87 over the desired RF channel to the CFP 12. The initiation burst 87 is a single frame of a MUX3 multiple logical format data packet 88, rather than the MUX 2 multiple logical format data packet 54 of the information burst 56 and the response burst 72, but the initiation burst 87 nonetheless includes a link request 58, a CFP identification 94, and a channel identifier 62. The CFP identification 94 indicates to the CFP 12 that the CFP 12 is the intended recipient of the initiation burst 87, and the channel identifier 62 indicates to the CFP 12 the desired RF channel for further communications.

The initiation burst 87, in the step of transmitting 90, is transmitted by the CPP 14 over a transmission cycle period that lasts for a minimum of 750 ms (Tpcyc), unless and until either: (i) a response by the CFP 12 to the initiation burst 87 is received by the CPP 14 or (ii) a link establishment timeout expires or (iii) the CPP 14 ceases to request link establishment. If the CFP 12 responds to the CPP 14 after the CFP 12 receives the initiation burst 87 and that response is received by the CPP 14, a one-way link is established when the CFP 12 detects the initiation burst 87 and responds to the CPP 14. After the one-way link is so established, the CFP 12 next transmits a reply to the CPP 14. If the CPP 14 detects the reply from the CFP 12, then the CPP 14 ceases the transmission of the initiation burst 87 and continues to receive the reply from the CFP 12. The CPP 14 stops transmission of the initiation burst 87 in less than a time period of 6.2 ms (Tcpp) after receiving the reply from the CFP 12. A timer of from 50 ms to 100 ms (Tpgrant) then starts at the CPP 14. If a code word that is specific for the particular CPP 14 is then received by the CPP 14 from the CFP 12 before expiration of the period of Tpgrant, the CPP 14 responds to the CFP 12 and halts the timer. If the code word is not received by the CPP 14 from the CFP 12 before expiration of the period of Tpgrant, then the reply from the CFP 12 continues for the remainder of the time of Tpcyc or until a further code word is received by the CPP 14 from the CFP 12. If the further code word is so received by the CPP 14, then the CPP 14 starts the timer for Tpgrant with the same eventualities.

If, on the other hand, the link establishment timeout expires without occurrence of the reply of the CFP 12 and the other events just described in the preceding paragraph, a new RF channel is selected by the CPP 14 and the CPP 14 commences to attempt a link over the new RF channel. The CPP 14 commences to attempt the link by transmitting the initiation burst 87 and awaiting the reply from the CFP 12. If the reply from the CFP 12 is received by the CPP 14, the CPP 14 continues to receive the reply and link establishment proceeds as described in the preceding paragraph. New RF channels continue to be chosen and the initiation burst 87 is transmitted over each new RF channel until the CPP 14 transmits and attempts the link over five different RF channels.

Finally, in the event that the reply from the CFP 12 is not received by the CPP 14 during a timeout period of 5.0 s (Tpmax) and a link set up is not made over any of the five RF channels, the CPP 14 ceases link set up attempts until a new call is again initiated at the CPP 14 by the user.

In a step of detecting 96, the CPP 14 begins to look for a reply burst 97 once the CPP 14 transmits the initiation burst 87 in the step of transmitting 90. The CFP 14 checks each of the possible RF channels for the initiation burst 87 in the step of detecting 96. If the initiation burst 87 is detected by the CFP 14, the CFP 14 reads and interprets the initiation burst 87 to determine the link request 58, the CFP identification 94, and the channel identifier 62. As in the method 10, the channel identifier 62 indicates the desired RF channel for further communications between the CPP 14 and the CFP 12.

In a step of setting 98, the CFP 14 programs a synthesizer 38 (FIG. 1) of the CFP 12 to cause the synthesizer 38 to immediately lock-on the desired RF channel indicated by the channel identifier 94. The step of setting 98 the synthesizer 38 is performed by the software program stored in the RAM 40 of the CFP 14. On command from the CFP 12, as controlled by the software program, the synthesizer 38 switches to the desired RF channel and, thereafter, transmits and receives on the desired RF channel.

In a step of replying 100, the CFP 12 transmits, in a TDD manner, the MUX2 multiple logical format data packet 54 as the reply burst 97 over the desired RF channel for receipt by the CPP 14. The reply burst 97 is transmitted by the CFP 12 over the desired RF channel, as read and interpreted by the CFP 12 from the channel identifier 94 of the initiation burst 87 transmitted by the CPP 14 in the step of transmitting 90. The reply burst 97 is of the same format as the MUX2 multiple logical format data packet 54. The reply burst 97 includes the link request 58, a CPP identification 104, and the channel identifier 62. The reply burst 97 indicates to the CPP 14 that the CFP 12 received the initiation burst 87. As previously mentioned, above, in connection with discussion of the step of transmitting 53 in the method 48, the reply burst 97 continues to be transmitted after the CPP 14 detects the reply burst 97 until the code word, as with the method 48, is received by the CPP 14 or the expiration of Tpgrant occurs.

In a step of re-initializing 106, the link between the CPP 14 and the CFP 12 is re-initialized through link initiation by the CFP 12. The link is re-initialized by the CFP 12 through transmission by the CFP 12 of a re-initialization burst of the same format and content of the information burst 56 (FIG. 3) of the method 48 (FIG. 1). Although the reinitialization burst is not identified in the Figures, the re-initialization burst is identical to the information burst 56. In effect, the step of re-initializing 106 proceeds entirely through the method 48, as if the CFP 12 (rather than the CPP 14) initiated the communication from the beginning. The step of re-initializing 106 is necessary because the CFP 12, upon receipt of the initiation burst 87 from the CPP 14, temporarily acts as slave to the CPP 14 to gain bit synchronization with the CPP 14 in connection with the initiation burst 87. The CFP 12 acts as the slave as it reads and interprets the initiation burst 87 to determine that the initiation burst 87 includes the CFP identification 94 appropriate to the CFP 12. Once the CFP 12 so acts as slave and reads and interprets the initiation burst 87 to determine the CFP identification 94 and the channel identifier 62, the step of re-initializing 106 causes the CPP 14 to be the slave to the CFP 12 as the master.

The method 84 concludes with the step of linking 76, as in the method 48 (FIG. 1). Once the step of linking 76 is concluded, communications of various desired data and voice information is communicated between the CFP 12 and the CPP 14 only over the desired RF channel that has been coordinated between the CFP 12 and the CPP 14.

The Initiation Burst:

Referring to FIG. 6, in conjunction with FIGS. 1 and 5, the CFP 12 expects, in the step of detecting 96, to receive the initiation burst 87 over one of the possible RF channels. In the step of transmitting 90, the CPP 14, after choosing the desired RF channel, transmits the initiation burst 87. The transmission by the CPP 14 of the single frame of the MUX3 multiple logical format data packet 88, which is multiplex three (MUX3), is the initiation burst 87. The initiation burst 87 is transmitted by the CPP 14 over 10 ms. Transmission of the MUX3 multiple logical format data packet 88 over the 10 ms is followed by a lapse in transmissions for a period of 4 ms during which the CPP 14 accepts the response, if any, from the CFP 12. As the CFP 12 scans the possible RF channels in the step of polling 86, the CFP 12 receives the initiation burst 87 if the initiation burst 87 has been transmitted by the CPP 14 and if the CFP 12 detects the initiation burst 87 when checking the desired RF channel during the scan.

The single frame of the MUX3 multiple logical format data packet 88 of the initiation burst 87 includes two sub-channels multiplexed with the available data bandwidth of the desired RF channel. The MUX3 multiple logical format data packet 88 of the initiation burst 87 carries as the sub-channels a D channel 108 and a SYN channel 110. During transmission, each of the subchannels, the D channel 108 and the SYN channel 110, is further sub-multiplexed by repetition four times over.

The D channel 108 is control data. The D channel 108 comprises twenty-bit words 112 split into ten-bit sections surrounded by a preamble 114. The first sixteen bit sequence of the D channel 108 is a synchronization word, SYNCF 108a. The SYN channel 110 is synchronization data. The SYN channel 110 comprises twelve-bits as a preamble 116 followed by twenty four-bits as a channel marker (CHMP) 118. The preamble 116 of the SYN channel 110 allows the CFP 12 to gain bit synchronization, initially, before the CFP 12 detects the CHMP 118 of the SYN channel 110. The CHMP 118 is a special bit pattern which marks the initiation burst 87 transmitted by the CPP 14 as an attempt by the CPP 14 to initiate the link with the CFP 12. The CHMP 118 has the following bit pattern:

0100.0001.1011.0001.1010.1111 (41B1AFH)

If the CHMP 118 is detected within the period of the transmit time (Tcpp) prior to the expiration of the timeout period (Tpmax), the D channel 108 is then decoded by the CFP 12 to yield for the CFP 12 the control information of the D channel 108, including the link request 58, the CFP identification 94, and the channel identifier 62. Although it may appear in FIG. 6, for lack of a better way to represent it, that the link request 58, the CFP identification 94, and the channel identifier 62 are provided only within a single ten bit sequence of the MUX3 multiple logical format data packet 88, it is to be understood that the link request 58, the CFP identification 94, and the channel identifier 62 are provided by interspersed bits throughout the whole of the D channel 108 of the frame.

The Reply Burst:

Referring to FIG. 7, in conjunction with FIGS. 1 and 5, the CPP 14 expects to receive the reply burst 97 from the CFP 12 in the step of replying 100, if the CFP 12 has detected the initiation burst 87 transmitted by the CPP 14. If the CFP 12, in fact, receives the initiation burst 87, the CFP 12 transmits the reply burst 97. The CFP 12 transmits the reply burst 97 over the desired RF channel indicated by the channel identifier 62 (FIG. 6), as read and interpreted by the CFP 12 from the initiation burst 87.

The reply burst 97 comprises the MUX2 multiple logical format data packet 54, including the two sub-channels. The MUX2 multiple logical format data packet 54 in the case of the reply burst 97 includes a D channel 80 and a SYN channel 82. The D channel 80 and the SYN channel 82 are carried at the same rates and comprise the same number of bits previously described with respect to the information burst 56 (FIG. 3) and the response burst 72 (FIG. 4) of the method 48 (FIG. 2).

The reply burst 97, however, differs from the information burst 56 and the response burst 72 in that the SYN channel 82 contains a SYNCF 83b. The SYNCF 83b is a bit pattern used when a one-way link has been established by the CPP 14 with the CFP 12. The SYNCF 83b has the following bit pattern:

1110.1011.0001.1011.0000.0101 (EB1B05H)

The SYNCF 83b may only be transmitted to re-initialize the link between the CFP 12 and the CPP 14 when the CHMP 118 of the initiation burst 87 has been correctly detected and the CFP identification 94 (FIG. 6) found by the CFP 12 is correct for the CFP 12.

Voice Communications:

After completion of the method 84, including the re-initialization pursuant to the method 48 (FIG. 2) at the step of re-initializing 106, the CFP 12 and the CPP 14 thereafter transmit and receive protocols and data and voice information over the desired RF channel in a conventional manner.

Setting the Synthesizer:

Referring to FIG. 8, in conjunction with FIGS. 1–7, each of the method 48 and the method 84 for coordinating the RF channel for communications include the step of setting 68 or 98, respectively. Each of the steps of setting 68 and 98 is performed in the same manner as the other, however, the step of setting 68 is performed by the CPP 14 and the step of setting 98 is performed by the CFP 12. The CPP 14 performs the step of setting 68 if the CFP 12 initiates the communication according to method 48, whereas the CFP 12 performs the step of setting 98 if the CPP 12, instead, initiates the communication according to method 84.

In method 48, the step of setting 68 occurs after the CPP 14 receives and reads, in the step of detecting 66, the information burst 56 transmitted by the CFP 12 in the step of transmitting 53. In method 84, the step of setting 98 occurs after the CFP 12 receives and reads, in the step of detecting 96, the initiation burst 87 transmitted by the CPP 14 in the step of transmitting 90. Hardware of the CPP 14 or CFP 12 receiving the information burst 56 or the initiation burst 87, respectively, synchronizes the CPP 14 or CFP 12, respectively, to read and interpret the bit pattern of the burst 56 or 87. The respective hardware also strips out the channel identifier 62 in the burst 56 or 87, as the case may be. The hardware for these operations of synchronizing and stripping is conventional and known to those skilled in the relevant art.

Once the channel identifier 62 is so stripped by the hardware, the software program stored in the RAM 46' or 46 controls the step of setting 68 or 98, respectively, at whichever of the CPP 14 or the CFP 12 receives the burst 56 or 87, respectively. The software program controlling the step of setting 68 or 98 performs in accordance with a method, referred to, in general, in FIG. 8 by the reference numeral 120.

In a step 122, the radio module 19' of the CPP 14 or the radio module 19 of the CFP 12 has previously received the burst 56 or 87, respectively. Upon the receipt of the burst 56 or 87 by the CPP 14 or the CFP 12, the radio module 19' or 19, respectively, is powered up. Further, the SIO port 44' or 44 of the respective synthesizer 38' or 38 of the radio module 19' or 19, as the case may be, is set up with respect to port timing and mode. Thereafter, the SIO port 44' or 44 is enabled.

In a step 124, a time delay occurs if, on power up in the step 122, the radio module 19' or 19, as the case may be, wakes from a low power mode. The purpose of the time delay is to allow the synthesizer 38' or 38, respectively, a period for power up stabilization. The time delay is 2.0 ms before proceeding to a step 126. If the radio module 19' or 19 on power up is already in a normal power mode, however, the step 126 does not occur and, after the step 122, the step 126 occurs.

In the step 126, a serial stream of bits corresponding to the channel identification 60 of the information burst 56 received by the CPP 14, if the CFP 12 initiates the communication, or to the channel identification 94 of the initiation burst 87 received by the CFP 12, if the CPP 14 initiates the communication, is sent and written to the synthesizer 38' or 38 of the CPP 14 or the CFP 12, respectively. The serial stream of bits comprises sixteen bits as follows:

0x81 0x01

Once sent and written to the synthesizer 38' or 38, the serial stream of bits initializes dividers of the phase lock loop 38a' or 38a of the synthesizer 38' or 38, respectively.

In a step 128, a next serial stream of bits is sent and written to the synthesizer 38' or 38 of the CPP 14 or the CFP 12, respectively. Six bits of the serial stream so written to the synthesizer 38' or 38 are as follows:

0x04

Additional bits of the serial stream are written to the synthesizer 38' or 38 as follows:

For the synthesizer 38 of the CFP 12:

Five bits: 0×10

Eight bits: 2 * (RF_Channel+0×27)

For the synthesizer 38' of the CPP 14:

Five bits: 0×0E

Eight bits: 2 * (RF_Channel+0×3C).

In a step 130, another time delay occurs if, on power up in the step 122, the radio module 19' or 19 of the CPP 14 or CFP 12, respectively, that receives the initial communication, wakes from a low power mode. The purpose of the time delay is to allow the synthesizer 38' or 38 a period for first channel stabilization. After the step 130, the step 132 occurs. If the radio module 19' or 19 on power up is already in a normal power mode, however, the step 130 does not occur and, after the step 128, the step 132 occurs.

In the step 132, yet another time delay occurs to allow the respective synthesizer 38' or 38, as the case may be, a period for channel to channel stabilization.

In a step 134, the SIO port 44' or 44 of the respective synthesizer 38' or 38 of the CPP 14 or the CFP 12 receiving the initial communication, as the case may be, is disabled.

The foregoing shows and describes only certain embodiments of the invention. In particular, the embodiments are well-suited to application in and implementation with a conventional digital cordless telephone, for example, such a telephone that is designed and operates in accordance with the CT2 specification but is being adapted for the ISM band. It is, nonetheless, to be understood that the invention can take many other forms and embodiments. The specific embodiments shown and described here are intended merely to illustrate, not to limit, the invention. Numerous other and alternative variations may be made without departing from the spirit or scope of the invention.

Referring to FIGS. 3 and 5, in conjunction, in certain alternative embodiments, the channel identification 62 of the information burst 56 or the initiation burst 87 may be varied as to number of bits employed for the channel identification 62. For example, because most instances of uncoordinated communications occur over adjacent RF channels, a single bit may be employed to indicate either an upward frequency or a downward frequency shift as the channel identification 62. A further example in which limited numbers of bits are necessary to indicate a frequency shift includes identification of the RF channel for coordinated communications as odd or even by the channel identification 62. In another example, sufficient numbers of bits may be employed so that the channel identification 62 is indicative of the exact RF channel as to which communications are coordinated.

Referring to FIGS. 2, 5 and 8, in conjunction, in certain other alternative embodiments, the software program that performs the steps of setting 68 or 98 may be incorporated in hardware logic of the digital cordless telephone 10 (FIG. 1). In other examples, the software program could be stored in virtually any form of memory, such as ROM, RAM, EEPROM, magnetic storage media, and others.

Referring to FIGS. 1, 2 and 5, in conjunction, certain other alternative embodiments provide for further coordination of RF channels between the CFP 12 and the CPP 14. For example, if a channel over which the CFP 12 and the CPP 14 are communicating becomes noisy or otherwise unsuitable, either the CFP 12 or the CPP 14 could, automatically or manually by action of a user, again commence the method 48 or 84, respectively, in order to coordinate between the CFP 12 and the CPP 14 a new RF channel for communications.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A digital cordless telephone for communicating with a telecommunications network over a wire link connecting the digital cordless telephone to the telecommunications network, the digital cordless telephone receives first communications signals from and delivers second communications signals to the telecommunications network, comprising:

a cordless fixed part connected to the wire link for receiving the first communications signals from the telecommunications network and for sending the second communications signals to the telecommunications network over the wire link, the cordless fixed part also for transmitting the first communications signals, together with first control information generated by the cordless fixed part and comprising a channel identifier indicative of a desired radio frequency communication channel, and for receiving the second communications signals, together with second control information, over radio frequency;

a cordless portable part, unattached physically, but communicatingly attached through radio frequency, to the cordless fixed part, for transmitting the second communications signals, together with the second control information generated by the cordless portable part and comprising the channel identifier and a second recipient identification, over radio frequency for receipt by the cordless fixed part, and for receiving the first communications signals, together with the first control information, over radio frequency from the cordless fixed part;

a fixed part memory, connected to the cordless fixed part, for receiving the second control information;

a portable part memory, connected to the cordless portable part, for receiving the first control information;

a fixed part microcontroller, connected to the fixed part memory and the cordless fixed part, for generating the first control information, including the channel identifier, and for controlling the cordless fixed part to transmit the first communications signals over the desired radio frequency communication channel; and a portable part microcontroller, connected to the portable part memory and the cordless portable part, for reading the channel identifier and controlling the cordless portable part to transmit the second communications signals over the desired radio frequency communication channel based on the channel identifier.

2. The digital cordless telephone of claim 1, wherein the cordless portable part comprises a synthesizer, the synthesizer comprises:

means for polling by the cordless portable part of each of more than one possible communication channels to check for the first communications signals;

means for detecting by the cordless portable part to determine that the first communications signals are transmitted by the cordless fixed part, to receive the first communications signals if so transmitted, and to determine the channel identifier of the first communications signals indicative of the desired radio frequency communication channel;

means for setting by the cordless portable part of a channel over which the cordless portable part communicates to the desired radio frequency communication channel, based on the determination of the channel identifier; and means for responding by the cordless portable part with the second communications signals to indicate to the cordless fixed part that the cordless portable part received the first communications signals and is ready for further communication over the desired radio frequency communication channel.

3. The digital cordless telephone of claim 1, wherein the cordless portable part comprises a synthesizer, the synthesizer comprises a port timing, a serial input/output port, and a mode of the serial input/output port, the synthesizer further comprising:

means for receiving the channel identifier representative of the desired radio frequency communication channel by the cordless portable part from the cordless fixed part over radio frequency;

means for storing the channel identifier in the portable part memory as digital bits;

means for powering up the synthesizer of the cordless portable part;

means for setting the port timing and the mode of the serial input/output port of the synthesizer to ready the synthesizer to receive a serial stream of digital data representative of the digital bits in the portable part memory;

means for enabling the synthesizer to receive the serial stream of digital data; and means for delaying to allow the synthesizer to stabilize on the specific radio frequency channel represented by the serial stream of digital data as derived from the channel identifier.

4. A digital cordless telephone for communicating with a telecommunications network over a wire link connecting the digital cordless telephone to the telecommunications network, the digital cordless telephone receives first communications signals from and delivers second communications signals to the telecommunications network, comprising:

a cordless portable part for transmitting first communications signals, together with first control information generated by the cordless portable part and comprising a channel identifier indicative of a desired radio frequency communication channel, over radio frequency for receipt by the cordless fixed part, and for receiving second communications signals, together with second control information, over radio frequency;

a cordless fixed part connected to the wire link for receiving the second communications signals from the telecommunications network and for sending the first communications signals to the telecommunications network over the wire link and also communicatingly attached through radio frequency, although unattached physically, to the cordless portable part, the cordless fixed part also for receiving the first communications signals, together with first control information, including the channel identifier, from the cordless portable part over radio frequency and for transmitting the second communications signals, together with second control information generated by the cordless fixed part and comprising the channel identifier indicative of the desired radio frequency communication channel;

a fixed part memory, connected to the cordless fixed part, for receiving the second control information;

a portable part memory, connected to the cordless portable part, for receiving the first control information;

a fixed part microcontroller, connected to the fixed part memory and the cordless fixed part, for generating the first control information, including the channel identifier, and for controlling the cordless fixed part to transmit the first communications signals over the desired radio frequency communication channel; and a portable part microcontroller, connected to the portable part memory and the cordless portable part, for reading the channel identifier and controlling the cordless portable part to transmit the second with unique portable-part identification communications signals over the desired radio frequency communication channel based on the channel identifier.

5. The digital cordless telephone of claim 4, wherein the cordless fixed part comprises a synthesizer, the synthesizer comprises:

means for polling by the cordless fixed part of each of more than one possible communication channels to check for the first communications signals;

means for detecting by the cordless fixed part to determine that the first communications signals are transmitted by the cordless portable part, to receive the first communications signals if so transmitted, and to determine the channel identifier indicative of the desired radio frequency communication channel;

means for setting by the cordless fixed part of a channel over which the cordless portable part communicates to the desired radio frequency communication channel; and means for responding by the cordless fixed part with the second communications signals to indicate to the cordless portable part that the cordless fixed part received the first communications signals and is ready for further communication over the desired radio frequency communication channel.

6. The digital cordless telephone of claim 4, wherein the cordless portable part comprises a synthesizer, the synthesizer comprises a port timing, a serial input/output port, and a mode of the serial input/output port, the synthesizer further comprising:

means for receiving the channel identifier representative of the desired radio frequency communication channel by the cordless portable part from the cordless fixed part over radio frequency;

means for storing the channel identifier in the portable part memory as digital bits;

means for powering up the synthesizer of the cordless portable part;

means for setting the port timing and the mode of the serial input/output port of the synthesizer to ready the synthesizer to receive a serial stream of digital data representative of the digital bits in the portable part memory;

means for enabling the synthesizer to receive the serial stream of digital data; and means for delaying to allow the synthesizer to stabilize on the specific radio frequency channel represented by the serial stream of digital data as derived from the channel identifier.

7. A method of coordinating a desired radio frequency communication channel, from among more than one possible communication channels, between a fixed part and a cordless portable part of a digital cordless telephone, the desired radio frequency communications channel serving to carry communications signals passed between the cordless fixed part and the cordless portable part, comprising the steps of:

polling by the fixed part of each of the more than one possible communication channels to check for a transmission by the cordless portable part;

transmitting by the cordless portable part over the desired radio frequency communication channel to initiate a first communication with the fixed part over the desired radio frequency communication channel;

detecting by the fixed part to determine that the first communication is initiated through the step of transmitting, to receive the fist communication if the communication is so initiated, and to determine a channel identifier of the first communication indicative of the desired radio frequency communication channel;

setting by the fixed part of a channel over which the fixed portable part communicates to the desired radio frequency communication channel, based on the determination of the channel identifier through the step of detecting; and responding by the fixed part with a second communication including unique fixed part identification to indicate to the cordless portable part that the fixed portable part received the first communication and is ready for further communication over the desired radio frequency communication channel.

8. A method, according to claim 7, wherein the first communication is sent with cordless portable part identification and wherein the fixed part responds to the first communication by returning information in the same format as the first communication except for the unique fixed part identification in place of the cordless portable part identification.

9. A method of setting a synthesizer of a first cordless part of a digital cordless telephone so the first cordless part transmits over a specific radio frequency channel chosen by a second cordless part of the digital cordless telephone, comprising the steps of:

receiving an indicator representative of the specific radio frequency channel by the first cordless part from the second cordless part over radio frequency;

storing the indicator in a memory as digital bits;

powering up the synthesizer of the first cordless part;

setting a port timing and a mode of a serial input/out port of the synthesizer to ready the synthesizer to receive a serial stream of digital data representative of the digital bits in the memory;

enabling the synthesizer to receive the serial stream of digital data;

sending the serial stream of digital data from the memory to the synthesizer;

writing the serial stream of digital data to the synthesizer; and delaying to allow the synthesizer to stabilize on the specific radio frequency channel represented by the serial stream of digital data as derived from the indicator.

10. The method of claim 9, further comprising the steps of:

delaying after the step of enabling, if the synthesizer is in low power mode prior to the step of powering up; and delaying after the step of writing, if the synthesizer is in low power mode prior to the step of powering up.

11. The method of claim 9, further comprising the steps of:

transmitting by the first cordless part over the specific radio frequency channel for receipt by the second cordless part; and disabling the synthesizer from receiving a next serial stream of digital data.

12. A method, according to claim 9, wherein the step of delaying is in response to the step of powering up wherein delay is provided to permit the synthesizer adequate time to phase lock after power up.

13. A method of coordinating a desired radio frequency communication channel, from among more than one possible communication channels, between a cordless fixed part and a cordless portable part of a digital cordless telephone, the desired radio frequency communications channel serving to carry communications signals passed between the cordless fixed part and the cordless portable part, comprising the steps of:

polling by the cordless portable part of each of the more than one possible communication channels to check for a transmission by the cordless fixed part;

transmitting by the cordless fixed part over the desired radio frequency communication channel to initiate a first communication with the cordless portable part over the desired radio frequency communication channel;

detecting by the cordless portable part to determine that the first communication is initiated through the step of transmitting, to receive the first communication if the communication is so initiated, and to determine a channel identifier of the first communication indicative of the desired radio frequency communication channel;

setting by the cordless portable part of a channel over which the cordless portable part communicates to the desired radio frequency communication channel, based on the determination of the channel identifier through the step of detecting; and responding by the cordless portable part with a second communication and a second recipient identification to indicate to the cordless fixed part that the cordless portable part received the first communication and is ready for further communication over the desired radio frequency communication channel.

14. The method of claim 13, further comprising the steps of:

polling by the cordless fixed part of each of the more than one possible communication channels to check for a transmission by the cordless portable part;

transmitting by the cordless portable part over one of the possible communication channels to initiate a first communication with the cordless fixed part over the desired radio frequency communication channel;

detecting by the cordless fixed part to determine that the first communication is initiated through the step of transmitting, to receive the first communication if the communication is so initiated, and to determine a channel identifier indicative of the desired radio frequency communication channel;

setting by the cordless fixed part of a channel over which the cordless fixed portable part communicates to the desired radio frequency communication channel, based on the determination of the channel identifier; and responding by the cordless fixed part with a second communication to indicate to the cordless portable part the desired radio frequency communication channel and that the cordless fixed part received the first communication and is ready for further communication over the desired radio frequency communication channel.

15. A method, according to claim 13, wherein the first communication is sent with fixed part identification and wherein the cordless portable part responds to the first communication by returning information in the same format as the first communication except for the second recipient identification in place of the fixed part identification.

16. A method, according to claim 13, further including the cordless portable part responding to the first communication by transitioning from a low-power mode to a normal power mode.

17. A method, according to claim 16, wherein transitioning from a low-power mode to a normal power mode includes delaying the second communication to allow stabilization by circuitry in the cordless portable part.

18. A method, according to claim 17, wherein the first communication is sent with fixed part identification and wherein the cordless portable part responds to the first communication by returning information in the same format as the first communication except for the second recipient identification in place of the fixed part identification.

* * * * *

UNITED STATES PATENT AND TRADEMARK OFFICE
CERTIFICATE OF CORRECTION

PATENT NO.    : 5,903,846
DATED         : May 11, 1999
INVENTOR(S)   : Finch et al.

Page 1 of 1

It is certified that error appears in the above-identified patent and that said Letters Patent is hereby corrected as shown below:

Column 19,
Line 64, after "second" please insert -- communication signals --.
Line 65, after "identification", please delete "communication signals".

Column 20,
Line 64, "fist" should read -- first --.

Signed and Sealed this

Nineteenth Day of March, 2002

Attest:

JAMES E. ROGAN
Attesting Officer
Director of the United States Patent and Trademark Office